United States Patent [19]  [11]  4,147,737
Sein et al.  [45]  Apr. 3, 1979

[54] POWDER COATING COMPOSITION EMPLOYING MIXTURE OF POLYEPOXIDE RESIN WITH MODIFIED POLYESTER RESIN

[75] Inventors: Anton J. Sein; Johan Reitberg, both of Zwolle; Johan M. Schouten, Dalfsen, all of Netherlands

[73] Assignee: Internationale Octrooi Maatschappij Octropa B.V., Rotterdam, Netherlands

[21] Appl. No.: 782,685

[22] Filed: Mar. 30, 1977

Related U.S. Application Data

[63] Continuation of Ser. No. 624,693, Oct. 22, 1975, abandoned, which is a continuation of Ser. No. 316,943, Dec. 20, 1972, abandoned, which is a continuation-in-part of Ser. No. 211,648, Dec. 23, 1971, abandoned.

[30] Foreign Application Priority Data

Dec. 23, 1970 [GB] United Kingdom ............... 61107/70

[51] Int. Cl.$^2$ ............................................. C08L 63/00
[52] U.S. Cl. ............................... 260/835; 260/37 EP; 260/836; 260/837 R; 427/27; 427/185; 428/418; 428/458
[58] Field of Search ............ 260/835, 47 EP; 427/27, 427/185, 195, 385, 386

[56] References Cited

U.S. PATENT DOCUMENTS

| | | | |
|---|---|---|---|
| 3,062,770 | 11/1962 | Hirsch | 260/835 |
| 3,106,769 | 10/1963 | Goethe et al. | 29/155.56 |
| 3,227,637 | 1/1966 | Dehart | 204/38 |
| 3,242,142 | 3/1966 | Hyde | 260/835 |
| 3,297,782 | 1/1967 | Barkis | 260/835 |
| 3,310,431 | 3/1967 | Loose | 117/201 |
| 3,397,254 | 8/1968 | Wynstra et al. | 260/835 |
| 3,529,034 | 9/1970 | Groff | 260/824 |
| 3,548,026 | 12/1970 | Weisfeld et al. | 260/835 |
| 3,549,403 | 12/1970 | Williams et al. | 117/17 |
| 3,624,232 | 11/1971 | Van Dorp | 117/21 |

Primary Examiner—Theodore E. Pertilla
Attorney, Agent, or Firm—Pollock, Vande Sande & Priddy

[57] ABSTRACT

Thermosetting coating compositions for powder coating processes, having a good powder stability, comprise a mixture of 4–25 wt% of a polyepoxide resin, the average molecule of which contains at least two epoxy groups, and 75–96 wt% of a solid modified polyester resin having an acid number of 30–100 and softens in the range of 60°C.–130° C. The solid modified polyester resin is the reaction product of an anhydride of a polybasic, organic carboxylic acid and a polyester having a hydroxyl number of 15–50 derived from a dibasic aromatic carboxylic acid and a specific alcohol component.

28 Claims, No Drawings

POWDER COATING COMPOSITION EMPLOYING MIXTURE OF POLYEPOXIDE RESIN WITH MODIFIED POLYESTER RESIN

CROSS REFERENCES TO RELATED APPLICATIONS

This application is a continuation of application Ser. No. 624,693 filed Oct. 22, 1975 and now abandoned, which in turn is a continuation of application Ser. No. 316,943 filed Dec. 20, 1972 and now abandoned, which in turn is a continuation-in-part of application Ser. No. 211,648 filed Dec. 23, 1971 and now abandoned.

BACKGROUND OF THE INVENTION

1. Field of the Invention

This invention relates to thermosetting coating compositions which are suitable for application by powder spray methods and fluidized bed coating processes, and methods for the production of such coating compositions. More particularly, this invention relates to solid, modified polyester resins which are cross-linked by polyepoxide resins and to thermosetting coating compositions comprising said modified polyester resins and polyepoxide resin cross-linking agent, which coating compositions are in the form of a stable free-flowing powder, suitable for application by powder spray methods and fluidized bed coating processes.

2. The Prior Art

Generally, thermosetting curable coating compositions are in the form of a solution of a synthetic resin in an organic solvent serving as a carrier. This solution is applied to the base surface, which may be metal, wood, paper or textile, after which the solvent carrier is evaporated and a synthetic resin film remains, which then may be subjected to a heat-hardening treatment.

The use of organic solvents as a carrier for the synthetic resin has the disadvantage that in most cases the solvents are inflammable or even may give rise to explosions. Moreover some organic solvents are physiologically unacceptable as they endanger the health of operators. In addition, much energy is required for the evaporation of the organic solvent and for the conditioning of the air which must carry away the solvent vapors from the oven in which the coated objects are baked.

For these reasons it has been proposed to replace the organic solvents wholly or partially by water. The use of water as a carrier for the synthetic resin, however, dictates the use of certain types of synthetic resins, which might not impart the required technological properties, such as flow, levelling and gloss to the finished coatings.

In view of the disadvantages of the preceding methods, it has also been proposed to apply high-melting thermoplastic, non-curable coating compositions in the form of a homogeneous powder. This powder is mostly applied by the method known as the fluidized bed method. This method is essentially a dipping process wherein the article to be coated is preheated to a temperature above the melting point of the coating composition and then introduced into a fluidized mass of coating composition powder articles.

Powdered thermosetting, curable coating compositions may be applied to the substrate in the same way, requiring, however, two heat treatments, firstly the preheating of the object to be coated and subsequently the curing treatment of the coated object. For this reason the electrostatic powder spray application method has been developed, in which only one heat treatment is required, namely the curing treatment, and this method has the additional advantage that thinner layers (less than 100 microns) may be applied than in the fluidized bed method. Due to the relatively high viscosity of the molten powder, coatings are provided (even in one treatment) which are substantially thicker than can be obtained by the conventional coating methods using solutions of the coating material. Sharp edges or bends are also much better coated by the powder coating processes.

The formulation of fusible, powdered coating compositions for application by powder spray methods and fluidized bed processes introduces requirements for film-forming materials which are entirely different from those met in the formulation of conventional coatings. It will be clear that the film-forming material must be a solid which can readily be converted into a free-flowing powder and is non-caking under normal storage conditions, and that the material must be capable of fusing at an elevated temperature below its degradation or decomposition temperature.

In practice the manufacture of a thermoplastic powder coating has involved much fewer difficulties than that of a thermosetting powder coating. This is due to the fact that the thermoplastic powder coating after application hardens by simple cooling, whereas a thermosetting system has to undergo cross-linking to obtain the desired film properties. For this purpose it is necessary to introduce a curing agent, cross-linking agent or catalyst into the system, which involves special problems.

Up till now the most important thermosetting powder coating systems are entirely based upon epoxy resins, which have as their main disadvantage poor outdoor durability.

Hence there is still a need for powdered free-flowing, fusible, thermosetting coating compositions which are stable during storage, which can be used in electrostatic powder-spray coating processes, and which have a reduced epoxy resin content and therefore can be heat-cured in an acceptable time to a uniform coating having satisfactory chemical and mechanical properties and an acceptable price.

SUMMARY OF THE INVENTION

It is an object of the present invention to provide curable thermosetting coating compositions which are suitable for application by powder spray methods and fluidized bed coating processes and particularly to provide solid modified polyester resins to be cross-linked by polyepoxide resins, which can be used in coating powders to be applied by powder spray methods and fluidized bed coating processes.

Another object of the present invention is to provide thermosetting resin compositions containing said solid, modified polyester resin and polyepoxide resin in the form of stable, free-flowing powder suitable for application in powder spray methods and fluidized bed coating processes.

DESCRIPTION OF THE INVENTION

The present invention therefore provides a mixture of 4 to 25% and preferably 8 to 15% by weight of polyepoxide resin with 75 to 96% and preferably 85 to 92% of solid modified polyester resins having an acid number from 30 to 100, preferably from 40 to 80 and most preferably from 55 to 70, and softening in the range of 60° C. to 130° C. (modified ball and ring test) which can be cross-linked with the polyepoxide resin, said modified polyester resins comprising the reaction product of an anhydride of a polybasic, organic carboxylic acid and a polyester resin, having a hydroxyl number from 15 to 50, preferably from 15 to 40 and most preferably from 25 to 40, of which the acid component comprises a dibasic, aromatic carboxylic acid and of which the alcohol component comprises:

(a) from 0 to 100 mole% (based on the total) alcohol component of the polyester) of an alcohol having the general formula:

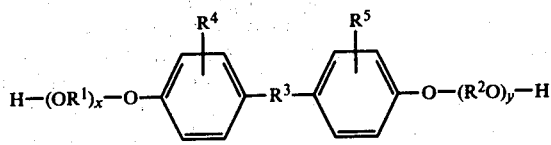

in which $R^1$ and $R^2$ represent alkylene groups having from 2 to 4 and preferably 2 to 3 carbon atoms, R represents a direct bond between the rings or an alkylidene group having from 1 to 4, and preferably 3 or 4 carbon atoms, or a cycloalkylidene group having 6 carbon atoms, or a carbonyl group, or a sulphone group, x and y are numerals each being at least one, the sum of x and y being not greater than 6, and $R^4$ and $R^5$ represent a hydrogen atom or alkyl radical having from 1 to 6 carbon atoms;

(b) from 0 to 40 mole % (based on the total alcohol component of the polyester) of a glycidyl ester having the general formula:

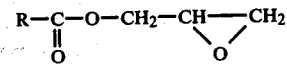

in which R is a straight or branched chain, saturated or unsaturated hydrocarbon radical having from 4 to 20 carbon atoms, or a substituted or unsubstituted benzene nucleus; and (c) from 0 to 100 mole % (based on the total alcohol component of the polyester) of at least one dihydric, aliphatic alcohol, the sum of the alcohol components (a), (b) and (c) being 100 mole %.

As the anhydride of the polybasic organic carboxylic acid may be used one or more anhydrides of aromatic, at least tribasic carboxylic acids, such as the anhydride of trimellitic acid, pyromellitic acid, hemimellitic acid, benzophenone tetracarboxylic acid, and naphthalene tetracarboxylic acid. Also a mixture of anhydride of at least tribasic aromatic carboxylic acid and up to 50 mole % (of the mixture of anhydride) of one or more anhydrides of saturated or unsaturated, aliphatic, aromatic, cyclo-aliphatic or heterocyclic dibasic or higher carboxylic acid such as maleic acid, succinic acid, butane tetracarboxylic acid, tricarballylic acid, phthalic acid, tetrahydrophthalic acid, endomethylene tetrahydrophthalic acid, hexachloroendomethylene tetrahydrophthalic acid, tetrahydrofuran tetracarboxylic acid, cyclopentane tetracarboxylic acid and maleopimaric acid, may be used.

If the polyester to be reacted with the anhydride of the polybasic, organic carboxylic acid has a high melting point on the order of about 80° C. and over, and more preferably about 100° C. and over, from 0 to 50 mole % and in fact from more than 50 to 100 mole% of the total anhydride may be one or more anhydrides of saturated or unsaturated, aliphatic, aromatic, cyclo-aliphatic or heterocyclic dibasic and higher polycarboxylic acids such as for example any of the acids mentioned in the preceding paragraph. The powder coating composition obtained by forming a mixture of the resultant solid modified polyester with polyepoxide resins exhibits improved rheological properties in the molten state accompanied by good (i.e., moderate to excellent) powder stability. However, the preferred powder coatings are obtained through the use of anhydrides of at least tribasic aromatic acids alone or in admixture with anhydrides of dibasic or higher acids, the best results being obtained in most cases when substantially all of the anhydride component is made up of at least tribasic aromatic acid anhydrides, including those having one, two and more anhydride groups.

As the dibasic, aromatic carboxylic acid in the acid component of the polyester resin may be used: orthophthalic acid, terephthalic acid and, isophthalic acid, esters of these acids with lower aliphatic, monohydric alcohols such as methanol, or ethanol. The dibasic, aromatic acids may be used either singly or in combination with one another. The preferred dibasic aromatic acid is terephthalic acid. It has in some cases been found advantageous to use up to 10 mole % (based on the total acid component) of a polybasic, aliphatic carboxylic acid, such as adipic acid, hexachlorophthalic or tetrahydrophthalic acid, or of a tribasic, aromatic carboxylic acid, such as trimellitic acid or pyromellitic acid.

Examples of the diols forming component (a) of the polyester resin include, 2,2'-di-(4-beta-hydroxyethoxyphenyl)-propane; 2,2'-di-(4-beta-hydroxyethoxyphenyl)-butane; 2,2'di-(4-hydroxypropoxyphenyl)-propane; 2,2'-di-(3-methyl-4-beta-hydroxyethoxyphenyl)-propane; the polyoxyethylene or polyoxypropylene ether of 4,4¹-isopropylidene diphenol, wherein both phenolic groups are oxyethylated and/or oxypropylated and the average number of oxyethylene and/or oxypropylene groups is from 2 to 6; di-(4-beta-hydroxyethoxyphenyl)-ketone and di-(4-beta-hydroxypropoxyphenyl)-ketone.

The preferred diols are 2,2'-di-(4-beta-hydroxyethoxyphenyl)-propane and 2,2'-di-(4-hydroxypropoxyphenyl)-propane.

The alcohol component (b) of the polyester resin comprises glycidly esters and those that can be used include, lauric acid glycidyl ester, benzoic acid glycidyl ester and glycidyl esters of saturated aliphatic monocarboxylic acids having tertiary or quanternary carbon atoms in alpha-position relative to the carboxyl groups (available under the trade name of "Versatic acids"). The latter glycidyl esters are preferred.

The alcohol, component (c) of the polyester resin comprises dihydric aliphatic alcohols such as 2,2-dimethylpropanediol-1,3, propylene glycol-1,2 1,4-cyclohexanedimethanol and ethylene glycol, which alcohols may contain other functional groups than hydroxyl groups, such as e.g. diethylene glycol. The dihydric aliphatic alcohols may be used either singly or in combination with one another.

It has in some instances been found advantageous to use up to 10 mole % (based on the total alcohol component) of aliphatic trihydric or polyhydric alcohols, such as trimethylol propane and pentaerythritol. In all cases, however, the sum of the alcohol components (a), (b), (c) and, optionally, the aliphatic trihydric or polyhydric alcohol is 100 mole %.

The polyester resins are prepared by the general techniques employed in the preparation of polyester resins. They can be conveniently made by heating all the reactants, while stirring, up to a temperature of 250° C., while an inert gas (e.g. nitrogen) is continuously passed through the reaction mixture to remove the water formed during the esterification reaction or the lower alcohol in re-esterification reactions. At the end of the esterification reaction, a vacuum of about 100 mm Hg is applied and some glycol is distilled off.

The anhydride of the polybasic, organic carboxylic acid is added to the polyester, while the latter is in molten form, and the mixture is heated for about 1–15 hrs., preferably 1–3 hrs., at about 180°–250° C., preferably 180°–210° C. The reaction product is then cooled to about 140° C. and poured into shallow receptacles to solidify. After cooling, the reaction product is crushed into small pieces and ground, suitably in a pin disc mill, to a free-flowing powder having the desired particle size range (approximately 20–150 microns). The free-flowing powder thus obtained may be subjected to a screening treatment to adjust the desired average particle size to the specific type of application for which the powder will be used.

As will be noted from the examples given below, the softening point of both the polyester to be reacted with the anhydride of a polybasic, organic carboxylic acid and the solid, modified polyester obtained is preferably from 60° C. to 130° C., but in some instances the softening point of the polyester to be modified may be lower, so that after reaction with the anhydride of a polybasic, organic carboxylic acid, the softening point of the modified polyester is from 60° C. to 130° C.

The polyepoxide resins used cross-linking agent for the solid, modified polyester resin are essentially solid (at 25° C.) compounds or mixtures of compounds, the molecules of which contain an average number of at least two epoxy groups.

Preferably the average number of epoxy groups contained in the molecule of the polyepoxide resin is three or more. Particularly desirable for the purpose of the invention is triglycidyl isocayanurate, although various other well-known polyepoxide resins may be used, provided that they contain at least two epoxy groups in their average molecule and that in combination with the solid modified polyester resins they lead to thermosetting coating compositions having a good powder stability as hereafter defined. Polyepoxide resins meeting the foregoing criteria may be found for example in U.S. Pat. 260/835 3,397,254 to J. Wynstra et al.

In preparing the stable, powdered free-flowing resin compositions according to the present invention, 75 to 96% by weight, preferably 85 to 92% by weight of the powdered modified polyester resin is mixed with 4 to 25% by weight, preferably 8 to 15% by weight of polyepoxide resin having at least two epoxy groups. The foregoing weight percentages are based on the weight of the total composition.

The solid modified polyester resin and the polyepoxide resin are mixed, for example in an extruder, for a time and at a temperature (at or above their melting points) such that they remain substantially unreacted, are then cooled to solidify the substantially unreacted mixture, and are subsequently crushed and ground in a suitable grinding device such as a pin disc mill, to a free-flowing powder having a particle size range of approximately 20–150 microns. The free-flowing powder so obtained may be subjected to a screening treatment to adjust the desired average particle size to the specific type of application for which the powder will be used. Substantial reaction between the solid modified polyester resin and the polyepoxide resin is accompanied by a noticeable impairment in the flow characteristics of the powder coating compositions in the molten state. However, it is an advantage of the present invention that reaction between the solid modified polyester resin and the polyepoxide resin in the extruder is not normally a problem and hence good control over product composition can be maintained during large scale production.

When filler and pigment components are employed, an alternative procedure is to melt the polyepoxide resin, add the filler and pigment components with mixing in an extruder, cool the blend obtained to solidify it and subsequently crush and grind it to a free-flowing powder having the required particle size range, which is then mixed with the solid, powered modified polyester resin having the same required particle size range.

The homogeneous, pulverulent coating compositions may also include various well-known functional modifiers such as grinding aids, curing agents or accelerators, flow control agents, surface-active agents, heat-stable organic or inorganic pigments, inert fillers, inhibitors, abrasives and plasticizers in their usual effective proportions.

After application of the coating compositions to the substrate, the coatings are cured at a temperature from about 120° C. to about 250° C. for a period of up to about 60 minutes. The curing treatment is preferably carried out for 10 to 40 minutes at 150° C. to 200° C.

The invention provides certain advantages in the matter of cure time, in that at a given temperature one may use the composition and method of the invention in such a way as to obtain shorter cure cycles than are normally experienced with other systems, now in use, which are based primarily on polyester resins.

The invention will be further illustrated by the following examples. In all examples concerning preparation of the final coating composition, modified polyester, epoxy resin and titanium dioxide pigment (in a weight ratio of 1:2, pigment to binding medium) were thoroughly dry mixed and then passed through an extruder in which they were melted and mixed, with a residence time of about 30 to 45 seconds, and then promptly discharged, cooled and powdered. In all examples and in the appended claims all softening points of the polyester and modified polyester resins were determined by a modified version of the ball and ring method according to A.S.T.M. Specification No. E 28-58 T. The method is modified in that the first temperature recorded is the temperature at which the ball begins to move and the last temperature is the temperature at which the ball strikes the bottom plate. In view of the application as powder coating, it has been found advantageous for the adjustment of the characteristics of the polyester resin to be modified to use these figures, rather than those set out in the A.S.T.M. Specification mentioned above.

EXAMPLE I

Into a suitable reaction vessel equipped with thermometer, stirrer, separating column and inert gas inlet tube, were introduced 2816 g (9 g mol) of the diether of ethylene glycol and bisphenol A, 480 g (2 g mol) of Cardura E (Trade Mark; glycidyl ester of branched chain monocarboxylic acids having from 9 to 11 carbon atoms), and 1660 g (10 g mol) of terephthalic acid. The contents of the vessel were heated to a temperature of about 180 to 250° C. and held at that temperature while stirring, whereby the water of the esterification reaction was removed from the reaction mass by bubbling nitrogen gas through it. The heating was continued until an acid number of 7 was reached. The resultant polyester has a softening point of 78–96° C. and a hydroxyl number of 30. 1000 g of this polyester resin were heated in a reaction vessel of the same type as described above to 200°–210° C. while nitrogen was bubbled through the molten mass. Then 103 g (0.53 g mol) of the anhydride of trimellitic acid were added with stirring, whereafter the resultant mixture obtained was heated for 3 hours at 200°–210° C., until an acid number of about 62 to 63 was obtained. The heating was stopped, the resultant product was cooled and solidified. The resultant modified polyester resin had an acid value of 62.8, a hydroxyl value of 0 and a softening point of 99°–111.5° C. The product is identified below as "Acid A".

EXAMPLES II and III

In the same apparatus as described in Example I, two other polyester resins were prepared, using the ingredients given in Table I. The acid numbers (AN), hydroxyl numbers (HN) and softening points (SP) in ° C. of these polyester resins are also indicated in Table I.

TABLE I

| Example | Alcohol | Moles Alcohol | Acid | Moles Acid | AN | HN | SP |
|---|---|---|---|---|---|---|---|
| (II) | Neopentyl-glycol | 9 | TPA$^2$ | 10 | 8 | 25 | 95–110° C. |
|  | DEGBA$^1$ | 0.66 |  |  |  |  |  |
|  | Cardura E | 1.57 |  |  |  |  |  |
| (III) | Neopentyl-glycol | 3 | TPA$^2$ | 10 | 8.5 | 32 | 74–88° C. |
|  | Ethylene glycol | 5 |  |  |  |  |  |
|  | Hexane-diol-1,6 | 1 |  |  |  |  |  |
|  | Cardura E | 2 |  |  |  |  |  |

$^1$DEGBA = diether of ethylene glycol and bisphenol A
$^2$TPA = terephthalic acid Modified Polyester Resins (IIa) 1000 g of the polyester resin of Example II were heated in the same apparatus and in the same way as described in Example I with 86.0 g (0.45 g mol) of the anhydride of trimellitic acid, whereby a modified polyester resin, hereafter identified as "Acid B" was obtained, having an acid number of 51, a hydroxyl number of 5 and a softening point of 96.6°–114° C.

(IIIa) 1250 g of the polyester resin of Example 3 were heated in the same apparatus and in the same way as in Example I with 141.3 g (0.74 g mol) of the anhydride of trimellitic acid, whereby a modified polyester resin, hereafter identified as "Acid C," was obtained, having an acid number of 69, a hydroxyl number of 0 and a softening point of 82°–99.5° C.

EXAMPLE IV

With the acid of "Acid A" a coating composition was prepared by mixing 80 g of powdered "Acid A"; 15 g of a powdered polyglycidylether of orthocresol-formaldehyde novolak, having an epoxy equivalent weight* of 225 and a melting point of 73° C. (Durran's mercury method as described by Gardner and Sward in "Paint Testing Manual," 12th edition, 1962 p. 367); and 0.3% by weight based on "Acid A" of tris-(2,4,6-dimethylaminomethyl)-phenol, a hardening catalyst, sold under the commercial indication "DMP-30" by Röhm and Haas Chemical Corp. of this composition 80–90% had a particle size between 70 and 100 microns. The pulverulent, pigmented resin mixture was applied on 1 mm thick mild steel panels by the electrostatic spray-coating method, in such a way that on subsequent curing at 180° C. for 30 minutes a uniform coating having a thickness of about 80 microns was obtained.

*The "epoxy equivalent weight" may be defined as the weight of polyepoxide resin in grams which contains one gram chemical equivalent of epoxy. The epoxy equivalent weight is determined by dissolving a one gram sample of the polyepoxide resin in 25 ml of 0,2 N pyridinium chloride in pyridine. After the sample has dissolved, the solution is heated under reflux for 25 minutes. The solution is cooled and 50 ml of methanol and 15 drops of phenolphthalein indicator are added. The excess pyridinium chloride is then back titrated with 0.5 N methanolic NaOH to a pink end point. The epoxide equivalent weight is calculated by considering that one HCl-molecule is equivalent to one epoxide group.

EXAMPLE V

A coating composition was prepared by mixing 88 g of powdered "Acid A" and 12 g of powdered triglycidyl isocyanurate, having an epoxy equivalent weight of 102 and a melting point of 95°–115° C. (ring and ball method). Of this composition 80–90% had a particle size between 70 and 100 microns. The powdered, free-flowing, pigmented resin mixture was applied on 1 mm thick mild steel panels by the electrostatic spray-coating method, in such a way that on subsequent curing at 180° C. for 30 minutes a uniform coating having a thickness of about 40 microns was obtained.

EXAMPLE IV

A coating composition was prepared by mixing 90 g of powdered "Acid B" and 10 g of the powdered triglycidyl isocyanurate metioned in Example V. Of this composition 80–90% had a particle size between 70 and 100 microns. The powdered, free-flowing pigmented resin mixture was applied on 1 mm thick mild steel panels by the electrostatic spray-coating method, in such a way that on subsequent curing at 150° C. for 30 minutes a uniform coating having a thickness of about 70 microns was obtained.

EXAMPLE VII

A coating composition was prepared by mixing 88 g of powdered "Acid C" and 12 g of the powdered triglycidyl isocyanurate of Example V, of this composition 80–90% had a particle size between 70 and 100 microns. The powdered, free-flowing, pigmented resin mixture was applied on 1 mm thick mild steel panels by the electrostatic spray-coating method, such that on subsequent curing at 150° C. for 30 minutes a uniform coating having a thickness of about 70 microns was obtained.

The resin compositions of the Examples IV–VIII and the coated mild steel panels obtained in these Examples were then investigated as to their powder stability and mechanical properties, respectively. The "powder stability" as indicated throughout this application and in the appended claims was determined as follows:

50 g of the pigmented, powdered, free-flowing composition (of which 80–90% had a particle size between 70 and 100μ) was heated in a glass beaker at 40° C. for 7 days. If the resin particles were not sintered together and the powder was still completely free-flowing, the powder stability was rated as excellent (E). If in the powder only some particles were sintered together, forming soft lumps, the powder stability was rated as moderate (M); if all particles were sintered together, the powder stability was rated as bad (B).

The "flexibility" was determined on the basis of the specimens of 1 mm thick mild steel panels, upon which an amount of the pulverulent resin mixture was applied by the electrostatic spray-coating method, and which were subsequently cured. Flexibility was rated as passing (P) or failing (F), depending upon whether or not the steel panel with the coating could be bent 180° over a ¾ inch diameter mandrel without impairing the coating. If the film cracked or broke, it was rated as failing. The "shock resistance" was determimed with the "Erichsen Schlagprüfgerät" according to German specification DIN 53,156 with the same specimens used for the flexibility test. The "hardness" was determined as "Pendelhärte nach König" according to German specification DIN 53,157 with the same specimens used for the flexibility test. The results are summarized in Table II below.

TABLE II

| Example | IV | V | VI | VII |
|---|---|---|---|---|
| Powder stability | E | E | E | M |
| Flexibility | P | P | P | P |
| Shock resistance (mm) | 2-3 | 4-5 | 2 | 3-4 |
| Hardness (sec.) | 183 | 195 | 210 | 180 |

EXAMPLES VIII and IX

In the same apparatus as described in Example I two other polyester resins were prepared using the ingredients as summarized in Table III. The same abbreviations are used as in Table I.

TABLE III

| Example | Alcohol | Moles Alcohol | Acid | Moles acid | AN | HN | SP |
|---|---|---|---|---|---|---|---|
| VIII | Propylene glycol | 9 | TPA | 10 | 9.2 | 28 | 96–113° C. |
|  | Dipropylene glycol | 2 |  |  |  |  |  |
| IX | Neopentyl-glycol | 3 | TPA | 10 | 6.4 | 36.5 | 80–92° C. |
|  | Ethylene glycol | 6 |  |  |  |  |  |
|  | Diethylene glycol | 1 |  |  |  |  |  |
|  | Cardura E | 1 |  |  |  |  |  |

Modified Polyester Resins (VIIIa) 1000 g of the polyester resin of Example VIII were heated in the same apparatus and in the same way as described in Example I with 97 g (0.5 g mole) of trimellitic acid anhydride, whereby a modified polyester resin, hereafter indicated as "Acid D" was obtained, having an acid number of 57 and a softening point of 108°–120° C.

(IXa) 1000 g of the polyester resin of Example IX were heated in the same apparatus and in the same way as described in Example I with 126 g (0.65 g mole) of trimellitic acid anhydride, whereby a modified polyester resin, hereafter indicated as "Acid E" was obtained, having an acid number of 66 and a softening point of 94°–104° C.

Final Coating Compositions (VIIIb) With aid of the "Acid D" a coating composition was prepared by mixing 100 g of powdered "Acid D," and 11.1 g of the powdered triglycidyl isocyanurate, mentioned in Example V. Of this composition more than 90% had a particle size from 70 to 100 microns. The powdered, free-flowing, pigmented resin mixture was applied on 1 mm thick mild steel panels by the electrostatic spray-coating method in such a way that on subsequent curing at 200° C. for 10 minutes a uniform coating having a thickness of about 70 to 80 microns was obtained. The powder stability and the mechanical properties found were as follows:

Powder stability: E
Flexibility: P
Shock resistance: 2 mm
Hardness: 192 sec (IXb) With the aid of "Acid E" a coating composition was prepared by mixing 645 g of powdered "Acid E" and 105 g of the powdered triglycidyl isocyanurate mentioned in Example V. Of this composition more than 90% had a particle size from 70 to 100 microns. The powdered, free-flowing, pigmented resin mixture was applied on 1 mm thick mild steel panels by the electrostatic spray-coating method in such a way that on subsequent curing at 200° C. for 10 minutes a uniform coating having a thickness of about 70 to 80 microns was obtained. The powder stability and the mechanical properties of the coating were determined to be as follows:

Powder stability: M
Flexibility: P
Shock resistance: 2–3 mm
Hardness: 197 sec.

EXAMPLE X

In the same apparatus as described in Example I a polyester resin was prepared from 9 moles of neopentylglycol, 1 mole of 1,6-hexanediol, 1 mole of Cardura E and 10 moles of terephthalic acid. The polyester obtained had an acid number of 8.3, a hydroxyl number of 38.3 and a softening point of 86°–103° C. 750 g of this polyester were heated in the same apparatus and in the same way as described in Example I with a mixture of 49.0 g of trimellitic acid anhydride and 102.0 g of maleopimaric acid anhydride, whereby a modified polyester resin, hereafter indicated as "Acid F" was obtained, having an acid number of 65.6 and a softening point of 92°–108° C. With the aid of the "Acid F" a coating composition was prepared by mixing 860 g of powdered "Acid F" and 140 g of the powdered triglycidyl isocyanurate as described in Example V. Of this composition more than 90% had a particle size from 70 to 100 microns. The powdered, free-flowing, pigmented resin mixture was applied on 1 mm thick mild steel panels by the electrostatic spray-coating method in such a way that on subsequent curing at 200° C. for 10 minutes a uniform coating having a thickness of about 50 to 60 microns was obtained. The powder stability and the mechanical properties of the coating were determined to be as follows:

Powder stability: E
Flexibility: P

Shock resistance: 3-4 mm
Hardness: 197 sec.

EXAMPLE XI

In the same apparatus as described in Example I, a polyester resin was prepared from 5 moles of ethylene glycol, 3 moles of neopentylglycol, 1 mole of 1,4-cyclohexanedimethanol, 2 moles Cardura E and 10 moles of terephthalic acid. The resultant polyester had an acid number of 9.3, a hydroxyl number of 32.5 and a softening point of 74°-83° C. 1824 g of this polyester were heated in the same apparatus and in the same way as described in Example I with 218.9 g of trimellitic acid anhydride, whereby a modified polyester resin, hereafter identified as "Acid G" was obtained, having an acid number of 66 and a softening point of 96°-117.5° C. With aid of the "Acid G" a coating composition was prepared by mixing 580 g of powdered "Acid G," and 170 g of powdered diglycidyl terephthalate. Of this composition more than 90% had a particle size from 70 to 100 microns. The powdered, free-flowing, pigmented resin mixture was applied on 1 mm thick mild steel panels by the electrostatic spray-coating method in such a way that on subsequent curing at 200° C. for 20 minutes a uniform coating having a thickness of about 50 to 60 microns was obtained. The powder stability and the mechanical properties of the coating were determined to be as follows:

Powder stability: M
Flexibility: P
Shock resistance: 1 mm
Hardness: 197 sec.

EXAMPLE XII

In the same apparatus as described in Example I, a polyester resin was prepared from 6 moles of ethylene glycol, 3 moles of neopentylglycol, 1 mole of diethylene glycol, 1 mole of Cardura E and 10 moles of terephthalic acid. The resultant polyester had an acid number of 6.4, a hydroxyl number of 36.5 and a softening point of 81°-97° C. 750 g of this polyester were heated in the same apparatus and in the same way as described in Example I with 93.9g of trimellitic acid anhydride, whereby a modified polyester resin, hereafter identified as "Acid H" was obtained, having an acid number of 83.3 and a softening point of 94°-104° C. With aid of "Acid H" a coating composition was prepared by mixing 600 g of powdered "Acid H" and 66 g of powdered triglycidyl isocyanurate. Of this composition more than 90% had a particle size from 70 to 100 microns. The powdered, free-flowing, pigmented resin mixture was applied on 1 mm thick mild steel panels by the electrostatic spray-coating method in such a way that on subsequent curing at 200° C. for 10 minutes a uniform coating having a thickness of about 50 to 60 microns was obtained. The powder stability and the mechanical properties of the coating were determined to be as follows:

Powder Stability: E
Flexibility: P
Shock resistance: 2-3 mm
Hardness: 200 sec.

EXAMPLES XIII-XV

In the same apparatus as described in Example I three other polyester resins were prepared, using the ingredients set forth in Table IV. The same abbreviations are used as in Table I.

TABLE IV

| Example | Alcohol | Moles Alcohol | Acid | Moles Acid | AN | HN | SP |
|---|---|---|---|---|---|---|---|
| XIII | Neopentyl-glycol | 3 | TPA | 10 | 5.5 | 33.7 | 86-102° C. |
| | Ethylene-glycol | 6 | | | | | |
| | 2,2,4-Tri-methyl-hexanediol-1,6 | 2 | | | | | |
| XIV | DEGBA | 3.5 | TPA | 10 | 5.9 | 49 | 64-84° C. |
| | Cardura E | 3 | | | | | |
| | 1,4-Cyclo-hexanedi-methanol | 4.5 | | | | | |
| XV | Ethylene glycol | 5 | TPA | 10 | 6.7 | 19 | 84.5-105° C. |
| | Cardura E | 2 | | | | | |
| | Neopentyl-glycol | 3 | | | | | |
| | Hexane-diol-1,6 | 1 | | | | | |

Modified polyester resins

XIIIa 1000 g of the polyester resin of Example XIII were heated in the same apparatus and in the same way as described in Example IX with a mixture of 58.5 g of trimellitic acid anhydride and 30.5 g of succinic acid anhydride, whereby a modified polyester resin hereafter identified as "Acid K" was obtained, having an acid number of 50.1 and a softening point of 93°114° C.

XIVa 750 g of the polyester of Example XIV were heated in the same apparatus and in the same way as described in Example I with a mixture of 126 g of trimellitic acid anhydride and 4 g of maleic acid anhydride, whereby a modified polyester resin, hereafter identified as "Acid L" was obtained, having an acid number of 94 and a softening point of 112°-126° C.

XVa 750 g of the polyester resin of Example XV were heated in the same apparatus and in the same way as described in Example I with a mixture of 41 g of trimellitic acid anhydride and 14 g of maleic acid anhydride, whereby a modified polyester resin hereafter identified as "Acid M" was obtained, having an acid number of 36 and a softening point of 87°-115° C.

Final Coating Compositions (XIIIb) With aid if Acid K a coating composition was prepared by mixing 440 g of powdered Acid K and 60 g of the powdered triglycidyl isocyanurate, mentioned in Example V. Of this composition more than 90% had a particle size from 70 to 100 microns. The powdered, free-flowing pigmented resin mixture was applied on 1 mm thick mild steel panels by the electrostatic spray-coating method in such a way that on subsequent curing at 200° C. for 10 minutes a uniform coating having a thickness of about 50 to 60 microns was obtained. The powder stability and the mechanical properties are given in Table V.

(XIVb) With aid of Acid L a coating composition was prepared by mixing 625 g of powdered Acid L and 75 g of the powdered triglycidyl isocyanurate, mentioned in Example V. Of this composition more than 90% had a particle size from 70 to 100 microns. The powdered free-flowing pigmented resin mixture was applied on 1 mm thick mild steel panels by the electrostatic spray-coating method in such a way that on subsequent curing at 200° C. for 10 minutes a uniform coating having a thickness of about 60 to 70 microns was obtained. The powder stability and the mechanical properties are given in Table V.

(XVb) With aid of Acid M a coating composition was prepared by mixing 630 g of powdered Acid M and 120 g of the powdered triglycidyl isocyanurate, mentioned in Example V. Of this composition more than 90% had a particle size from 70 to 100 microns. The powdered free-flowing pigmented resin mixture was applied on 1 mm thick mild steel panels by the electrostatic spray-coating method in such a way that on subsequent curing at 200° C. for 10 minutes a uniform coating having a thickness of about 50 to 60 microns was obtained. The powder stability and the mechanical properties are given in Table V.

TABLE V

| Example | XIII | XIV | XV |
| --- | --- | --- | --- |
| Powder stability | E | E | M |
| Flexibility | P | P | P |
| Shock resistance (mm) | 6 | 1 | 1 |
| Hardness (sec.) | 192 | 180 | 200 |

EXAMPLE XVI

In the same apparatus as described in Example I, a polyester resin was prepared from 11 moles of neopentyl glycol and 11 moles of tetrahydrophthalic acid. The resultant polyester had an acid number of 7.5, a hydroxyl number of 40 and a softening point of 56°–63° C.

1000 g of this polyester resin were heated in the same apparatus and in the same way described in Example I with 257.9 g of hexachlorophthalic acid anhydride, whereby a modified polyester resin, hereinafter identified as "Acid N" was obtained, having an acid number of 34 and a softening point of 74°–78° C.

With the aid of "Acid N" a coating composition was prepared by mixing 660 g of powdered "Acid N" and 90 g of powdered triglycidyl isocyanurate. Of this composition more than 90% had a particle size of from 70 to 100 microns.

The powdered, free-flowing, pigmented resin mixture was applied on 1 mm thick mild steel panels by the electrostatic spray-coating method in such a way that on subsequent curing at 200° C. for 10 minutes a uniform coating having a thickness of about 50 to 60 microns was obtained.

The powder stability and the mechanical properties of the coating were determined to be as follows:

Powder stability: E
Flexibility: P
Shock resistance: 3–3.

EXAMPLE XVII

In the same apparatus as described in Example I, a polyester resin was prepared from 6 moles of neopentyl glycol, 6 moles of 1,4-cyclohexanedimethanol and 10 moles of terephthalic acid. The resultant polyester had an acid number of 7.4, a hydroxyl number of 55 and a softening point of 118°–125° C.

1000 g of the polyester were heated in the same apparatus and in the same way described in Example I with 149.2 of tetrahydrophthalic acid anhydride, whereby a modified polyester resin, hereinafter identified as "Acid P," was obtained, having an acid number of 46 and a softening point of 68°–75° C. with the aid of "Acid P" a coating composition was prepared by mixing 675 g of powdered "Acid P" and 75 g of powdered triglycidyl isocyanurate. Of this composition more than 90% had a particle size of from 70 to 100 microns.

The powdered, free-flowing, pigmented resin mixture was applied on 1 mm thick mild steel panels by the electrostatic spray-coating method in such a way that on subsequent curing at 200° C. for 10 minutes a uniform coating having a thickness of about 50 to 60 microns was obtained.

The powder stability and the mechanical properties of the coating were determined to be as follows:

Powder stability: E
Flexibility: P
Shock resistance 4–5

What is claimed is:

1. A homogeneous pulverulent substantially unreacted thermosettable composition comprising a mixture of:
    (1) 4% to 25% by weight of a polyepoxide compound or mixture of compounds, the molecules of which contain an average of at least two epoxy groups, and
    (2) 75.% to 96% by weight of a solid modified polyester resin having an acid number of from 30 to 100, and which softens in the range 60° C. to 130° C., said solid modified polyester resin comprising the reaction product of:
      (a) an anhydride of a polybasic, organic carboxylic acid, and
      (b) a polyester resin having a hydroxyl number of from 15 to 50, the acid component of this polyester resin comprising a dibasic, aromatic carboxylic acid and the alcohol component comprising:
      (c) from 0 to 100 mole % (based on the total alcohol component of the polyester) of an alcohol having the general formula:

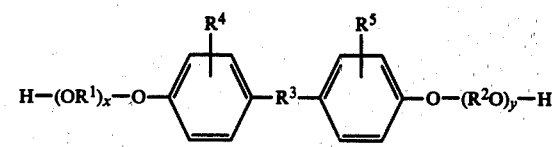

in which $R^1$ and $R^2$ represent alkylene groups having from 2 to 4 carbon atoms, $R^3$ represents a direct bond between the rings or an alkylidene group having from 1 to 4 carbon atoms or a cycloalkylidene group having 6 carbon atoms, or a carbonyl group, or a sulphone group, x and y are numerals each being at least one, the sum of x and y being not greater than 6, and $R^4$ and $R^5$ represent a hydrogen atom or alkyl radical having from 1 to 6 carbon atoms;
      (d) from 0 to 40 mole % (based on the total alcohol component of the polyester) of a glycidyl ester of the general formula:

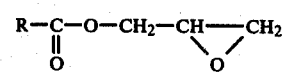

in which R is a straight or branched chain, saturated or unsaturated hydrocarbon radical having from 4 to 20 carbon atoms, or a substituted or unsubstituted benzene nucleus, and (e) from 0 to 100 mole % (based on the total alcohol component of the polyester) of at least one dihydric, aliphatic alcohol, the sum of the alcohol components (c), (d), and (e) being 100 mole %, and said composition having a good powder stability.

2. A composition according to claim 1, in which (a) is an anhydride of an aromatic at least tribasic carboxylic acid.

3. A composition according to claim 1, in which (a) is a mixture of an anhydride of an aromatic, at least tribasic carboxylic acid and up to 50 mole% (based on the mixture of acid anhydrides) of an anhydride of a saturated or unsaturated, aliphatic or aromatic or cycloaliphatic dibasic carboxylic acid.

4. A composition according to claim 1, wherein said polyester resin (b) has a softening point of at least 80° C., and in which anhydride (a) is composed of 0-100 mole % (based on the mixture of said anhydrides) of one or more anhydrides of saturated or unsaturated aliphatic or cycloaliphatic or heterocyclic polycarboxylic acids.

5. A composition accoring to claim 1, in which the polyepoxide compound is triglycidyl isocyanurate.

6. The composition of claim 1 being in powder form.

7. The composition of claim 1 being a powder having a particle size of about 20-150 microns.

8. The composition of claim 1, wherein said polyester having a hydroxyl number of from 15 to 50 softens in the range of 60° C. to 130° C.

9. A homogeneous pulverulent substantially unreacted thermosettable composition comprising a mixture of:

(1) 4% to 25% by weight of a polyepoxide compound or mixture of compounds, the molecules of which contain an average of at least two epoxy groups, and (2) 75% to 96% by weight of a solid modified polyester resin having an acid number of from 40 to 80, and which softens in the range 60° C. to 130° C., said solid modified polyester resin comprising the reaction product of:

(a) an anhydride of a polybasic, organic carboxylic acid, and (b) a polyester resin having a hydroxyl number of from 15 to 40, the acid component of this polyester resin comprising a dibasic, aromatic carboxylic acid and the alcohol component comprising:

(c) from 0 to 100 mole % (based on the total alcohol component of the polyester) of an alcohol having the general formula:

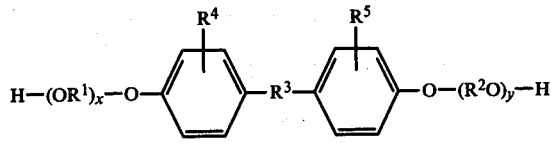

in which $R^1$ and $R^2$ represent alkylene groups having from 2 to 4 carbon atoms, $R^3$ represents a direct bond between the rings or an alkylidene group having from 1 to 4 carbon atoms or a cycloalkylidene group having 6 carbon atoms, or a carbonyl group, or a sulphone group, x and y are numerals each being at least one, the sum of x and y being not greater than 6, and $R^4$ and $R^5$ represent a hydrogen atom or alkyl radical having from 1 to 6 carbon atoms;

(d) from 0 to 40 mole % (based on the total alcohol component of the polyester) of a glycidyl ester of the general formula:

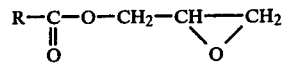

in which R is a straight or branched chain, saturated or unsaturated hydrocarbon radical having from 4 to 20 carbon atoms, or a substituted or unsubstituted benzene nucleus, and (e) from 0 to 100 mole % (based on the total alcohol component of the polyester) of at least one dihydric, aliphatic alcohol, the sum of the alcohol components (c), (d), and (e) being 100 mole %, and said composition having a good powder stability.

10. A composition according to claim 9, in which (2) has an acid number of from 55 to 70.

11. A composition according to claim 9, in which (b) has a hydroxyl number of at least 25.

12. A composition according to claim 9, in which the polyepoxide compound is triglycidyl isocyanurate.

13. The composition of claim 9, being in powder form.

14. The composition of claim 9, being a powder having a particle size of about 20-150 microns.

15. The composition of claim 9 wherein said polyester having a hydroxyl number of from 15 to 50 softens in the range of 60° C. to 130° C.

16. A homogeneous pulverulent substantially unreacted thermosettable composition comprising a mixture of:

(1) 8% to 15% by weight of a polyepoxide compound or mixture of compounds, the molecules of which contain an average of at least two epoxy groups, and (2) 85% to 92% by weight of a solid modified polyester resin having an acid number of from 40 to 80, and which softens in the range 60° to 130° C., said solid modified polyester resin comprising the reaction product of:

(a) an anhydride of a polybasic, organic carboxylic acid, and (b) a polyester resin having a hydroxyl number of from 15 to 40, the acid component of this polyester resin comprising a dibasic, aromatic carboxylic acid and the alcohol component is:

(c) from 0 to 100 mole % (based on the total alcohol component of the polyester) of an alcohol having the general formula:

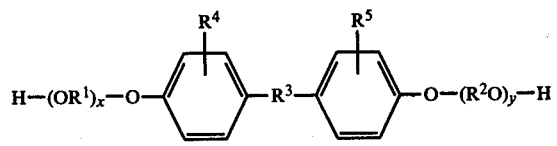

in which $R^1$ and $R^2$ represent alkylene groups having 2 or 3 carbon atoms, $R^3$ represents an alkylidene group having 3 or 4 carbon atoms, x and y are numerals each being at least one, the sum of x and y being not greater than 6 and $R^4$ and $R^5$ represent hydrogen atoms, so that the two nuclei are benzene nuclei, (d) from 0 to 40 mole % (based on the total alcohol component of the polyester) of a glycidyl ester of the general formula:

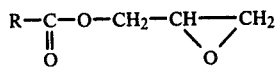

in which R is a branched chain, saturated alkyl group having from 4 to 10 carbon atoms, and (e) from 0 to 100 mole % (based on the total alcohol component of the polyester) of at least one dihydric, aliphatic alcohol, (f) from 0 to 10 mole % (based on the total alcohol component of the polyester) of at least one aliphatic, at least trihydric alcohol, the sum of the alcohol components (c), (d), (e), and (f) being 100 mole %, and said composition having a good powder stability.

17. A composition according to claim 16, in which the anhydride (a) is a mixture of an anhydride of an aromatic, at least tribasic carboxylic acid and up to 50 mole % (based on the mixture of acid anhydrides) of an anhydride of a saturated or unsaturated, aliphatic or aromatic or cycloaliphatic dibasic carboxylic acid.

18. A composition according to claim 16, in which in the alcohol component (c) is from 0 to 10 mole%, (d) is from 0 to 20 mole% and (e) is from 75 to 100 mole%.

19. A composition according to claim 16, in which the polyepoxide compound is triglycidyl isocyanurate.

20. A composition according to claim 16, in which the molecule of the polyepoxide resin contains an average of at least three epoxy groups and in which the anhydride (a) is trimellitic acid anhydride, pyromellitic acid anhydride or hemimellitic acid anhydride.

21. The composition of claim 16 being in powder form.

22. The composition of claim 16 being a powder having a particle size of about 20–150 microns.

23. The composition of claim 16 wherein said polyester having a hydroxyl number of from 15 to 50 softens in the range of 60° C. to 130° C.

24. The composition of claim 1, wherein said polyester includes up to 10 mole % (based on the total alcohol component) of aliphatic trihydric or polyhydric alcohols.

25. The composition of claim 1 wherein said polyester includes up to 10 mole % (based on the total acid component) of a polybasic, aliphatic carboxylic acid or of a tribasic, aromatic carboxylic acid.

26. The composition of claim 1 wherein said epoxide is polyglycidylether of orthocresol-formaldehyde novolak.

27. The composition of claim 1 wherein said epoxide is diglycidyl terephthalate.

28. The composition of claim 1 wherein said polyester melts above about 100° C. and wherein said anhydride includes at least one anhydride of saturated or unsaturated, aliphatic, aromatic, cycloaliphatic or heterocyclic dibasic and higher polycarboxylic acids.

* * * * *